United States Patent
Imai (10) Patent No.: US 9,664,581 B2
(45) Date of Patent: May 30, 2017

(54) PRESSURE SENSOR, ELECTRONIC APPARATUS, AND MOVING OBJECT

(71) Applicant: Seiko Epson Corporation, Tokyo (JP)

(72) Inventor: Hideo Imai, Shimosuwa (JP)

(73) Assignee: Seiko Epson Corporation (JP)

( * ) Notice: Subject to any disclaimer, the term of this patent is extended or adjusted under 35 U.S.C. 154(b) by 231 days.

(21) Appl. No.: 14/497,787

(22) Filed: Sep. 26, 2014

(65) Prior Publication Data

US 2015/0090041 A1 Apr. 2, 2015

(30) Foreign Application Priority Data

Sep. 30, 2013 (JP) ................................. 2013-205754

(51) Int. Cl.
*G01L 19/14* (2006.01)
*G01L 19/06* (2006.01)

(52) U.S. Cl.
CPC ............ *G01L 19/146* (2013.01); *G01L 19/06* (2013.01)

(58) Field of Classification Search
CPC .............................. G01L 19/146; G01L 19/06
USPC .......................................................... 73/715
See application file for complete search history.

(56) References Cited

U.S. PATENT DOCUMENTS

| 5,394,751 A * | 3/1995 | Ishibashi ............. G01L 19/0084 73/756 |
|---|---|---|
| 2001/0028072 A1 | 10/2001 | Aoki et al. |
| 2004/0188782 A1* | 9/2004 | Fujii ..................... B81B 7/0058 257/415 |
| 2007/0089511 A1 | 4/2007 | Sasaki |

FOREIGN PATENT DOCUMENTS

| JP | 09-126920 | 5/1997 |
| JP | 2001-153746 A | 6/2001 |
| JP | 2002-168716 A | 6/2002 |
| JP | 2004-003936 A | 1/2004 |
| JP | 2004-311951 A | 11/2004 |
| JP | 2007-095996 A | 4/2007 |

* cited by examiner

*Primary Examiner* — Walter L Lindsay, Jr.
*Assistant Examiner* — Ruth Labombard
(74) *Attorney, Agent, or Firm* — Harness, Dickey & Pierce, P.L.C.

(57) ABSTRACT

A pressure sensor includes a sensor chip that detects a pressure and generates an electric signal; a package that has an opening and an internal space in which the sensor chip is accommodated; and flying leads that protrude from the package into the internal space. The sensor chip is connected to the flying leads. Then, the sensor chip is disposed away from an inner wall of the package.

14 Claims, 8 Drawing Sheets

PRESSURE SENSOR, ELECTRONIC APPARATUS, AND MOVING OBJECT

BACKGROUND

1. Technical Field

The present invention relates to a pressure sensor, an electronic apparatus, and a moving object.

2. Related Art

In the related art, a pressure sensor is known which includes a sensor chip that detects a pressure and generates an electric signal of a level depending on the detected value, a package that accommodates the sensor chip, wirings that output the electric signal generated by the sensor chip to the outside of the package, and a bonding wire that electrically connects the sensor chip to wirings (see JP-A-2001-153746 and JP-A-2004-3936).

In the pressure sensor having such a configuration, typically, for the purpose of relieving stress from outside, that is, of preventing damage or low sensitivity of the sensor chip due to stress from the outside, the sensor chip is fixed (die-bonded) to a bottom surface of the package through a material having a low elastic modulus such as fluorosilicone-based adhesive.

Here, the electrical connection between the sensor chip and the wirings by the bonding wire is typically performed after the sensor chip is fixed to the bottom surface of the package through the adhesive described above.

Thus, since the package is positioned on the material having the low elastic modulus, there is a problem that ultrasonic waves are not sufficiently transmitted to the sensor chip during formation of the bonding wire to an electrode included in the sensor chip, and as a result, contact failure occurs between the electrode included in the sensor chip and the bonding wire.

SUMMARY

An advantage of some aspects of the invention is to provide a pressure sensor which has high sensitivity and in which stress from the outside is relieved, an electronic apparatus including the pressure sensor, and a moving object.

The invention can be implemented as the following forms or application examples.

Application Example 1

This application example is directed to a pressure sensor including: a sensor chip that detects a pressure and generates an electric signal; a package that has an internal space in which the sensor chip is accommodated; and flying leads that protrude from the package into the internal space, in which the sensor chip is supported by the flying leads.

With this configuration, it is possible to provide the pressure sensor which has high sensitivity and in which stress from the outside is relieved.

Application Example 2

In the pressure sensor according to the application example described above, it is preferable that the sensor chip is disposed away from an inner wall of the package.

With this configuration, it is possible to provide the pressure sensor which has high sensitivity and in which stress from the outside is relieved.

Application Example 3

In the pressure sensor according to the application example described above, it is preferable that the internal space is filled with a resin having flexibility.

With this configuration, since the sensor chip is sealed by the resin having flexibility, the sensor chip is protected and it is possible to further reduce operation of the stress from the outside on the sensor chip while reducing the stress from the outside operating on the pressure sensor.

Application Example 4

In the pressure sensor according to the application example described above, it is preferable that the sensor chip has a diaphragm groove, the package has an opening, and the diaphragm groove faces an opening side.

With this configuration, a surface opposite to the surface on which the diaphragm groove is formed is covered (shielded from light) from the opening side of the package by the surface on which the diaphragm groove is formed. Here, since a chip wiring section or an IC circuit is typically formed on the side of the surface opposite to the surface on which the diaphragm groove is formed, it is possible to prevent the chip wiring section, the IC circuit, and the like from deteriorating and degrading, for example, due to the light passing through the opening of the package by covering the surface on which the chip wiring section or the IC circuit is formed from the opening side of the package.

Application Example 5

In the pressure sensor according to the application example described above, it is preferable that the flying leads are conductive.

With this configuration, it is possible for the flying leads to exert a function as wirings by connecting the flying leads to a terminal included in the sensor chip.

Application Example 6

In the pressure sensor according to the application example described above, it is preferable that the sensor chip is connected to a surface of the flying leads on the opening side.

With this configuration, it is possible to further reduce the operation of the stress from the outside on the sensor chip through the flying leads.

Application Example 7

In the pressure sensor according to the application example described above, it is preferable that the pressure sensor includes an IC chip in the internal space.

It is possible to convert an amount of the pressure applied to the sensor chip by the IC chip, based on the electric signal generated by the sensor chip.

Application Example 8

In the pressure sensor according to the application example described above, it is preferable that the sensor chip is connected to the flying leads through the IC chip.

With this configuration, it is possible to further reduce the stress from the outside transmitted from the flying leads to the sensor chip by the IC chip interposed therebetween.

Application Example 9

This application example is directed to an electronic apparatus including the pressure sensor according to the application example described above.

With this configuration, it is possible to provide the electronic apparatus having excellent reliability.

Application Example 10

This application example is directed to a moving object including: the pressure sensor according to the application example described above.

With this configuration, it is possible to provide the moving object having excellent reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a pressure sensor, an electronic apparatus, and a moving object according to the invention will be described in detail with reference to embodiments illustrated in the accompanying drawings.

1. Pressure Sensor

First, the pressure sensor will be described.

First Embodiment

Figure 1A:
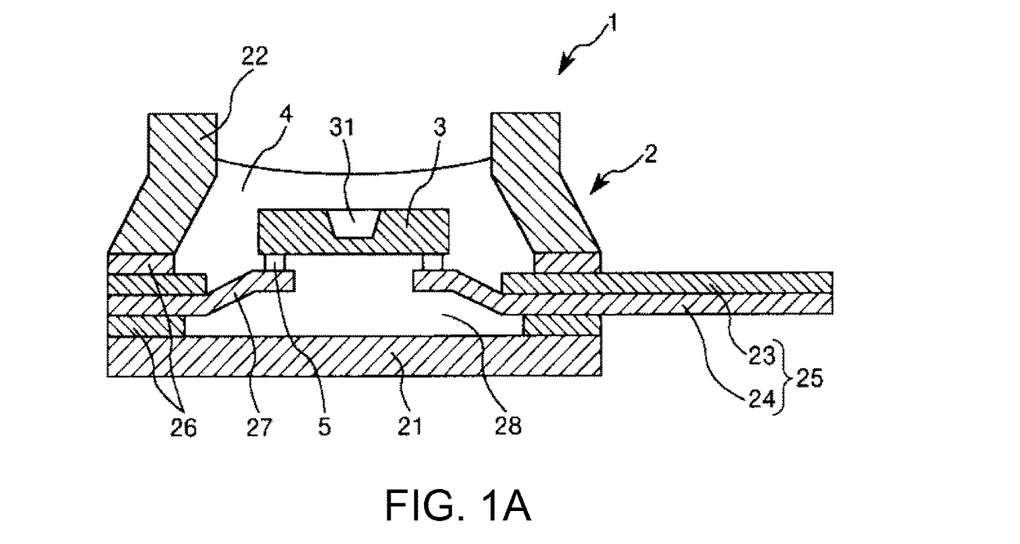
FIGS. 1A and 1B are views illustrating a first embodiment of a pressure sensor according to the invention.
Figure 1B:
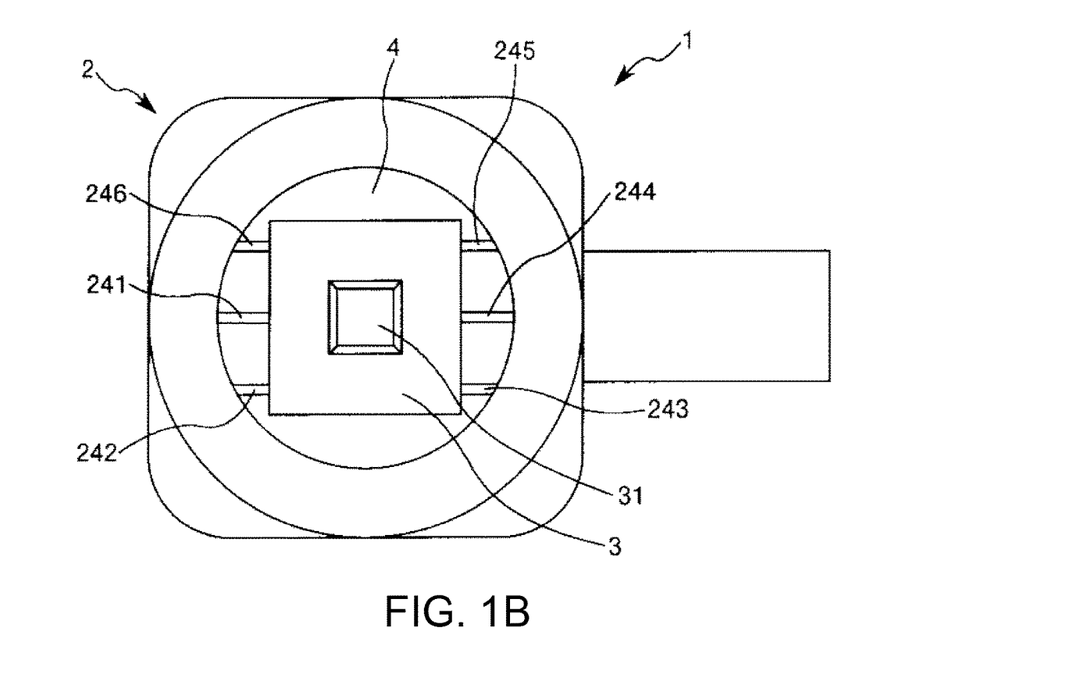
Figure 2A:
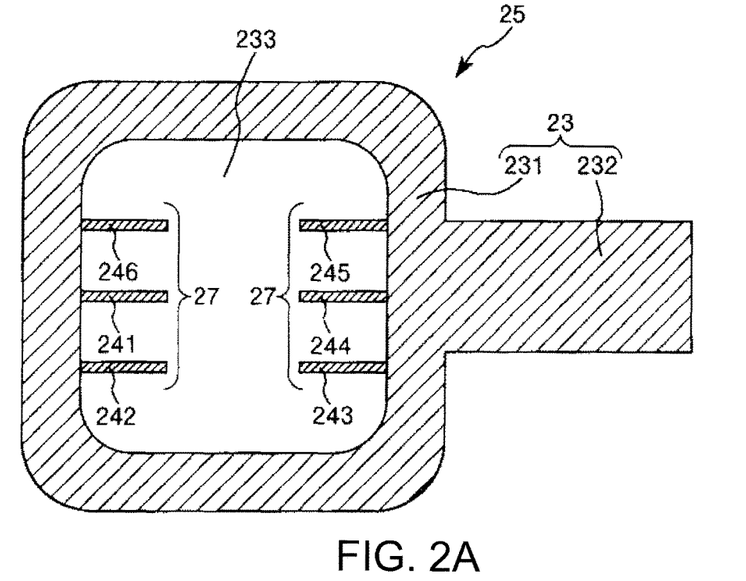
FIGS. 2A and 2B are plan views of a flexible wiring substrate included in the pressure sensor illustrated in FIGS. 1A and 1B.
Figure 2B:
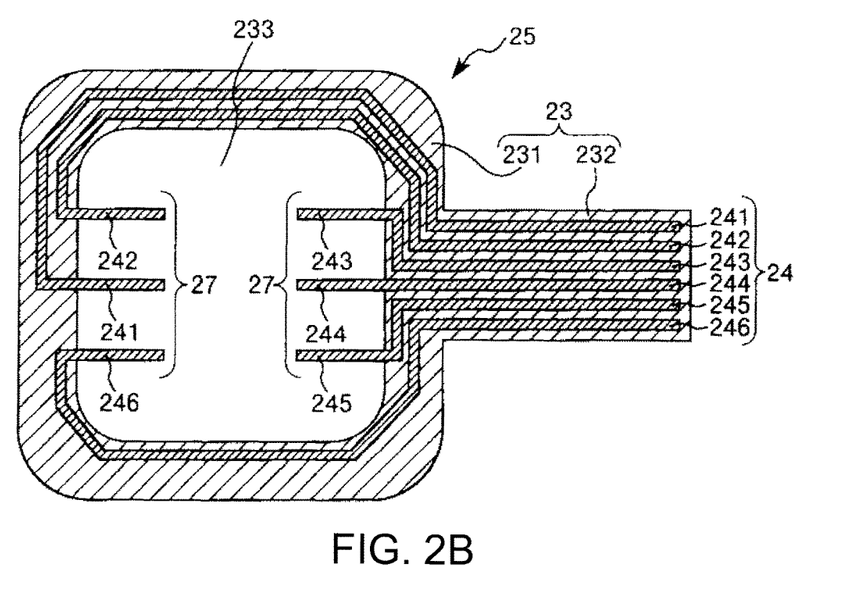

FIGS. 1A and 1B are views illustrating a first embodiment of a pressure sensor according to the invention (FIG. 1A is a vertical cross-sectional view and FIG. 1B is a plan view), FIGS. 2A and 2B are plan views of a flexible wiring substrate included in the pressure sensor illustrated in FIGS. 1A and 1B (FIG. 2A is a plan view that is viewed from a surface side and FIG. 2B is a plan view that is viewed from a rear surface side). Moreover, in the following description, an upper side is referred to as "upper", a lower side is referred to as "lower" in FIG. 1A, a front side of a paper surface is referred to as "upper" and a rear side of the paper sheet is referred to as "lower" in FIG. 1B and FIG. 2A, and a rear side of the paper sheet is referred to as "upper" and the front side of the paper sheet is referred to as "lower" in FIG. 2B.

A pressure sensor 1 illustrated in FIGS. 1A and 1B has a sensor chip (sensor element) 3, a package 2 that accommodates the sensor chip 3, and a mold section 4 that seals the sensor chip 3 inside the package 2.

The package 2 has a function to accommodate and fix the sensor chip 3 in an internal space 28 formed on the inside thereof.

In the embodiment, as illustrated in FIGS. 1A and 1B, the package 2 has a base (bottom portion) 21, a housing (cover) 22, and a flexible wiring substrate 25, and is configured by bonding the portions to each other in this order.

Moreover, bonding between the base 21 and the flexible wiring substrate 25, and bonding between the housing 22 and the flexible wiring substrate 25 are respectively performed through adhesive layers 26 consisting of adhesive. The adhesive is not specifically limited and, for example, it is possible to use silicone-based, and epoxy-based adhesive, and the like.

The base 21 configures the bottom surface of the package 2 and, in the embodiment, an entire shape thereof is planar and the shape in a plan view is a square shape.

A configuration material of the base 21 is not specifically limited and insulating materials of various ceramics such as oxide ceramics of alumina, silica, titania, zirconia, and the like, nitride ceramics of silicon nitride, aluminum nitride, titanium nitride, and the like, and various resin materials such as polyethylene, polyamide, polyimide, polycarbonate, acrylic resin, ABS resin, and epoxy resin are exemplified, and it is possible to use one kind or combination of two or more kinds of these. Various ceramics are preferred among them. Thus, it is possible to obtain the package 2 having excellent mechanical strength.

Moreover, the shape of the base 21 in a plan view may be, for example, a circular shape, a rectangular shape, a pentagonal or more polygonal shape, and the like in addition to the square shape illustrated in FIGS. 1A and 1B.

The housing 22 configures a cover section of the package 2 and an entire shape thereof is cylindrical and the shape in a plan view is a square shape on the lower side thereof and a circular shape on the upper side in the embodiment.

The housing 22 is configured of a first portion in which an outer diameter and an inner diameter thereof are gradually reduced to the middle of a package height toward the upper end from the lower end and a second portion in which the diameters are substantially constant toward the upper end from the middle thereof. The shape in a plan view in the first portion of the housing 22 is a square shape and the shape in a plan view in the second portion is a circular shape.

As a configuration material of the housing 22, it is possible to use the same material as that of the configuration material of the base 21.

Moreover, an entire shape of the housing 22 may be, for example, a circular shape in addition to the shape illustrated in FIGS. 1A and 1B.

The flexible wiring substrate 25 is positioned between the base 21 and the housing 22 in a thickness direction of the package 2 and has a function of fixing the sensor chip 3 inside the package 2 and outputting an electric signal generated in the sensor chip 3 to the outside of the package 2.

The flexible wiring substrate 25 is configured of a flexible base member 23 and a wiring 24 formed on the lower surface side of the base member 23.

In the embodiment, the base member 23 is configured of a frame body 231 of which a shape in a plan view is a frame shape of a square shape and a band body 232 that has an integrally formed band shape so as to protrude in one side of the frame body 231. An opening section 233 that is open in the thickness direction is formed in a center portion in the frame body 231.

A configuration material of the base member 23 is not specifically limited as long as having flexibility and polyimide, polyethylene terephthalate (PET), polyethylene naphthalate (PEN), polyethersulfone (PES), and the like are exemplified, and it is possible to use one kind or combination of two or more kinds of these.

The wiring 24 is conductive and, as illustrated in FIG. 2B, is provided (routed) over the frame body 231 and the band body 232, and, in the embodiment, has six wiring sections 241 to 246.

Among them, three wiring sections 243 to 245 are configured such that base end sides thereof are respectively provided in the band body 232 and leading end sides thereof are provided so as to protrude from one side on which the band body 232 is integrally formed among four sides configuring the frame body 231 into the inside of the opening section 233. Furthermore, three wiring sections 241, 242, and 246 are configured such that base end sides thereof are respectively provided in the band body 232 and leading end sides thereof are provided so as to protrude into the inside of the opening section 233 from one side facing one side of the frame body 231 on which the band body 232 is integrally formed after being routed through the frame body 231.

Flying leads (tab tapes) 27 are configured of the leading end sides of the wiring sections 241 to 246 protruding into the inside of the opening section 233. In the embodiment, the flying leads 27 are bent and rise upward in the opening section 233. The leading end portions thereof are disposed away from the frame body 231 and configure a fixing section for fixing the sensor chip 3, and configure a terminal electrically connected to a terminal included in the sensor chip 3.

As a configuration material of the wiring 24, metals such as Ni, Pt, Li, Mg, Sr, Ag, Cu, Co, and Al, an alloy such as MgAg, AlLi, and CuLi containing these metals, oxides such as ITO and $SnO_2$ are exemplified and it is possible to use one kind or combination of two or more kinds of these.

The package 2 is formed by laminating the base 21, the flexible wiring substrate 25, and the housing 22 in this order in a state where the adhesive layers 26 are interposed therebetween, and the internal space 28 that is open upward the housing 22 is defined on the inside thereof. Furthermore, at this time, the flying leads 27 protruding into the opening section 233 of the frame body 231 are disposed so as to protrude into the internal space 28. Furthermore, the frame body 231 included in the flexible wiring substrate 25 configures a body section that forms the internal space 28 and the band body 232 is formed so as to protrude from the body section. It is possible to take out the electric signal generated by the sensor chip 3 accommodated in the internal space 28 of the package 2 from the package 2, that is, into the electronic apparatus or the moving object by electrically connecting, for example, a motherboard of an electronic apparatus, a moving object, or the like described below to the wiring 24 provided corresponding to the band body 232, that is, to end portions of the wiring sections 241 to 246.

Moreover, bonding among the base 21, the flexible wiring substrate 25, and the housing 22 may be performed by various bonding methods such as anodic bonding and direct bonding by configuration materials and the like of the base 21, the flexible wiring substrate 25, and the housing 22 without interposing the adhesive layers therebetween.

The sensor chip (pressure-sensitive element) 3 has a function of generating the electric signal by detecting the pressure operating in the sensor chip 3 based on a detected value thereof.

The sensor chip 3 may be configured of any configuration as long as the sensor chip 3 has such a function, however, in the embodiment, as illustrated in FIGS. 1A and 1B, the sensor chip 3 having a diaphragm groove 31 is accommodated inside the package 2.

The sensor chip 3 has the diaphragm groove 31, an airtight space (not illustrated) formed inside thereof, a CMOS inverter circuit (not illustrated) formed between the diaphragm groove 31 and the airtight space, and a chip winding section (not illustrated) that is electrically connected to the CMOS inverter circuit.

In the sensor chip 3 having such a configuration, when applying the pressure to the sensor chip 3, a pressure difference is generated between the outside of the sensor chip 3 and the airtight space, as a result, deflection is generated in the diaphragm groove 31. The pressure applied to the sensor chip 3 is detected by converting a variation amount of the diaphragm groove 31 due to the deflection into the electric signal by a CMOS inverter, and then the electric signal is transmitted to the chip wiring section.

Furthermore, in the embodiment, the sensor chip 3 includes an IC circuit (not illustrated) and can convert an amount of the pressure applied to the sensor chip 3 by the IC circuit, based on the electric signal generated by the CMOS inverter.

In the embodiment, as illustrated in FIGS. 1A and 1B, the sensor chip 3 having such a configuration is mounted inside the package 2.

That is, the sensor chip 3 is accommodated in the internal space 28 of the package 2 so as not to come into contact with the inner wall of the package 2 by being away from the inner wall of the package 2. The sensor chip 3 is connected to a plurality (six in the embodiment) of flying leads 27 disposed so as to protrude into the internal space 28 through bumps 5. In other words, the sensor chip 3 is fixed to the leading end portions of the flying leads 27 through the bumps 5.

Therefore, the sensor chip 3 can be supported substantially horizontally with respect to the bottom surface of the package 2, that is, to the base 21 inside the internal space 28 without coming into contact with other parts than the flying leads 27. Furthermore, the bump 5 is provided so as to correspond to the terminal included in the chip wiring section (not illustrated) of the sensor chip 3 and thereby it is possible to electrically connect the sensor chip 3 to the flying leads 27, that is the leading end sides of the wiring sections 241 to 246.

As described above, since the sensor chip 3 is supported on the inside of the internal space 28 and the flying leads 27 exert a function as an elastic body configured of a metal material, it is possible to reduce the operation of the stress applied to the sensor chip 3 even if the stress from the outside operates on the pressure sensor 1 (the package 2). Therefore, damage and low sensitivity of the sensor chip 3 caused by the stress from the outside are reduced.

Furthermore, since fixing of the sensor chip 3 to the inside of the internal space 28 and electrical connection between the sensor chip 3 and the wiring 24 are simultaneously performed, it is possible to suppress or prevent contact failure between the terminal included in the chip wiring section of the sensor chip 3 and the flying leads 27 from occurring even if the sensor chip 3 is fixed on the elastic body.

Furthermore, in the embodiment, the flying leads 27 are bent upward and rise in the inside of the internal space 28 (the opening section 233) and the sensor chip 3 is fixed to the upper side of the flying leads 27 so that the diaphragm groove 31 faces upward (the opening side of the package 2). That is, the diaphragm groove 31 faces upward (the opening side of the package 2) and the sensor chip 3 is lifted and fixed to the flying leads 27. According to such a configuration, a surface opposite to the surface on which the diaphragm groove 31 is formed is covered (shielded from light) from the opening side of the package 2 by the surface on which the diaphragm groove 31 is formed. Here, since the chip wiring section or the IC circuit is typically formed on the surface side opposite to the surface on which the diaphragm groove 31 is formed, it is possible to suppress or prevent the chip wiring section, the IC circuit, and the like from deteriorating and degrading due to the light passing through the opening of the package 2, for example, by covering the surface on which the chip wiring section or the IC circuit is formed from the opening side of the package 2.

Furthermore, it is possible to further reduce the operation of the stress from the outside on the sensor chip 3 through the flying leads 27 by fixing the sensor chip 3 to be lifted to the flying leads 27 that are formed as strips, that is, by connecting the sensor chip 3 to the upper side of the flying leads 27.

Moreover, in the embodiment, a case where the sensor chip 3 detects the deflection of the diaphragm groove 31 by the CMOS inverter is described, however the invention is not limited to the case and the sensor chip 3 may be configured such that a piezo-resistance element is provided in the diaphragm groove 31 and the sensor chip 3 detects a change in a resistance value of the piezo-resistance element.

The mold section 4 fills the inside of the internal space 28 formed inside the package 2, thereby sealing the sensor chip 3 accommodated on the inside of the internal space 28.

The mold section 4 is configured of a flexible resin, for example, of a gel and as described above, the package 2 is open upward the housing 22. Therefore, it is possible for the pressure applied to the pressure sensor 1 to operate on the sensor chip 3 (the diaphragm groove 31) through the opening and the mold section (gel) 4 in the upper side of the housing 22.

Furthermore, since the sensor chip 3 is protected (dust-proof and waterproof) by the mold section 4 and the stress from the outside operating on the pressure sensor 1 (the package 2) can be reduced, it is also possible to further reduce the operation of the stress from the outside on the sensor chip 3 by the mold section 4.

As a configuration material of such a mold section 4, silicone resin is exemplified and the silicone resin may be either a one-fluid type or a two-fluid type.

Second Embodiment

Next, a second embodiment of a pressure sensor according to the invention will be described.

Figure 3:
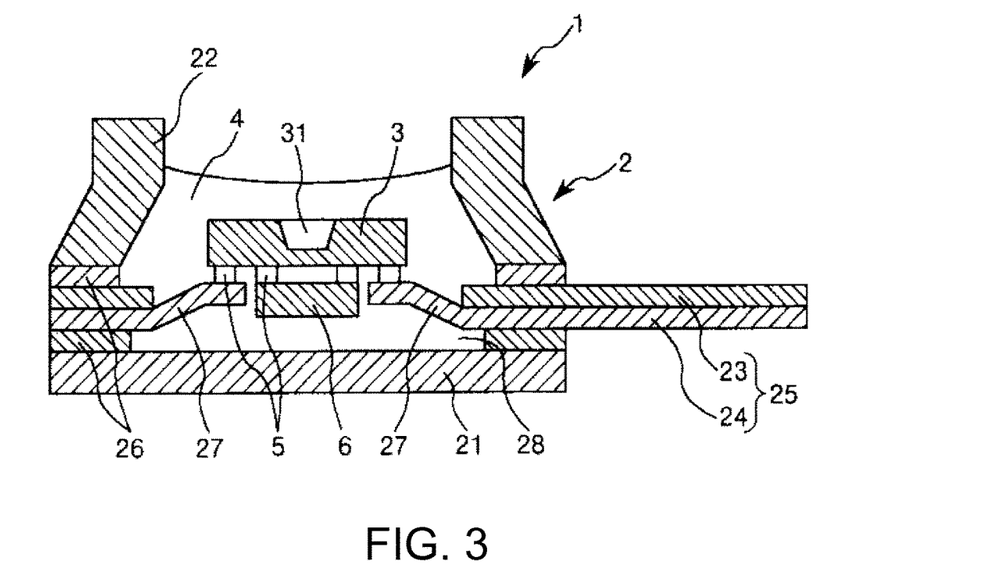
FIG. 3 is a vertical cross-sectional view illustrating a second embodiment of a pressure sensor according to the invention.

FIG. 3 is a vertical cross-sectional view illustrating the second embodiment of the pressure sensor according to the invention.

Hereinafter, the pressure sensor 1 of the second embodiment will be described focusing on differences from the pressure sensor 1 of the first embodiment described above and the description of the same matters will be omitted.

The pressure sensor 1 illustrated in FIG. 3 is similar to the pressure sensor 1 illustrated in FIGS. 1A and 1B other than that the configuration of the sensor chip 3 is different and the pressure sensor 1 includes an IC chip 6 in the internal space 28 thereof.

That is, in the pressure sensor 1 of the second embodiment, the formation of the IC circuit is omitted on the inside of the sensor chip 3 and the pressure sensor 1 includes the IC chip 6. Then, the terminal included in the IC chip 6 and the terminal included in the chip wiring section of the sensor chip 3 are electrically connected to each other through the bumps 5, and the IC chip 6 is fixed to the lower side of the sensor chip 3 so as to be lifted to the sensor chip 3. It is also possible to convert the amount of the pressure applied to the sensor chip 3 by such an IC chip 6, based on, for example, the electric signal generated by the sensor chip 3.

As described above, the IC chip 6 is fixed to the leading end portions of the flying leads 27 through the sensor chip 3.

The same effects as those of the first embodiment are also obtained by the pressure sensor 1 of the second embodiment described above.

Third Embodiment

Next, a third embodiment of a pressure sensor according to the invention will be described.

Figure 4:
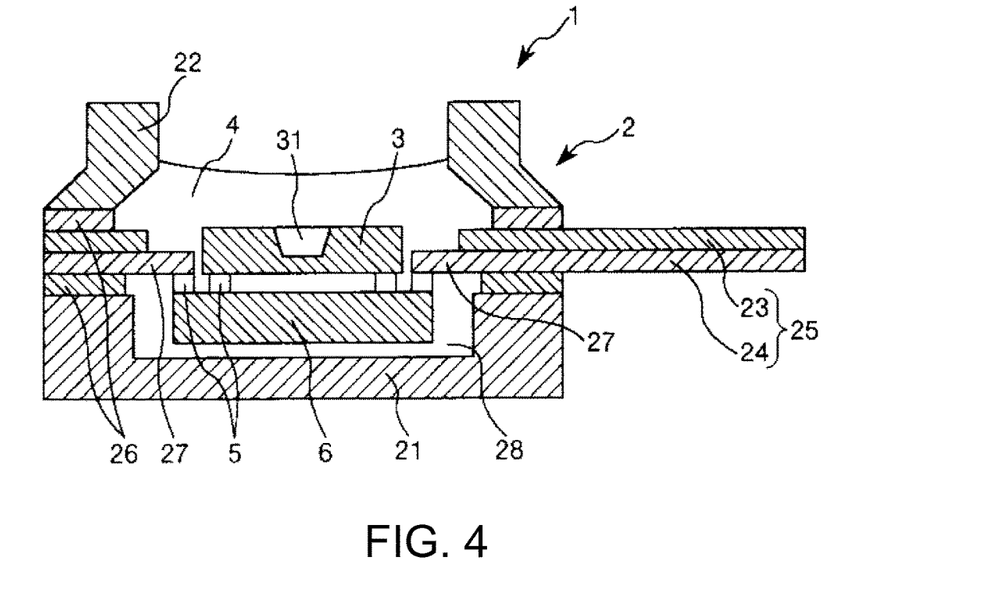
FIG. 4 is a vertical cross-sectional view illustrating a third embodiment of a pressure sensor according to the invention.

FIG. 4 is a vertical cross-sectional view illustrating the third embodiment of the pressure sensor according to the invention.

Hereinafter, the pressure sensor 1 of the third embodiment will be described focusing on differences from the pressure sensor 1 of the second embodiment described above and the description of the same matters will be omitted.

The pressure sensor 1 illustrated in FIG. 4 is similar to the pressure sensor 1 illustrated in FIG. 3 other than that the shape of the flying leads 27 is different and the arrangement positions of the sensor chip 3 and the IC chip 6 are different.

That is, in the pressure sensor 1 of the third embodiment, bending upward and rising of the flying leads 27 are omitted inside the internal space 28, and connection order of the sensor chip 3 and the IC chip 6 to the flying leads 27 is reversed.

More specifically, in the embodiment, first, the terminal included in the IC chip 6 and the leading end portions of the flying leads 27 are electrically connected to each other through the bumps 5, and thereby the IC chip 6 is fixed to the lower side of the flying leads 27 of which bending and rising are omitted so as to be lifted to the flying leads 27. Then, the terminal included in the chip wiring section of the sensor chip 3 and the terminal included in the IC chip 6 are electrically connected to each other through the bumps 5, and thereby the sensor chip 3 is fixed to the upper side of the IC chip 6 so as to be lifted to the IC chip 6 in a state where the diaphragm groove 31 faces upward.

As described above, the sensor chip 3 is fixed to the leading end portions of the flying leads 27 through the IC chip 6 in a state where the diaphragm groove 31 faces upward. As described above, it is possible to further surely reduce the stress from the outside transmitted from the flying leads 27 by interposing the IC chip 6.

The same effects as those of the first embodiment are also obtained by the pressure sensor 1 of the third embodiment described above.

Fourth Embodiment

Next, a fourth embodiment of a pressure sensor according to the invention will be described.

Figure 5:
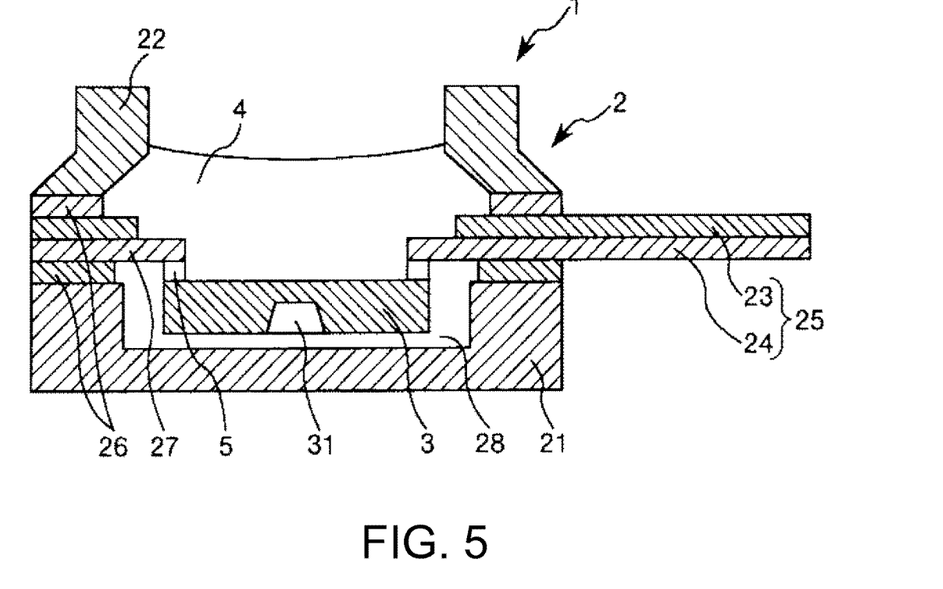
FIG. 5 is a vertical cross-sectional view illustrating a fourth embodiment of a pressure sensor according to the invention.

FIG. 5 is a vertical cross-sectional view illustrating the fourth embodiment of the pressure sensor according to the invention.

Hereinafter, the pressure sensor 1 of the fourth embodiment will be described focusing on differences from the pressure sensor 1 of the first embodiment described above and the description of the same matters will be omitted.

The pressure sensor 1 illustrated in FIG. 5 is similar to the pressure sensor 1 illustrated in FIGS. 1A and 1B other than that the shape of the flying leads 27 is different and the arrangement position and direction of the sensor chip 3 are different on the inside of the internal space 28.

That is, in the pressure sensor 1 of the fourth embodiment, bending upward and rising of the flying leads 27 are omitted on the inside of the internal space 28, and arrangement position of the sensor chip 3 is on the lower side of the flying leads 27.

More specifically, in the embodiment, the terminal included in the chip wiring section of the sensor chip 3 and the leading end portions of the flying leads 27 are electrically connected to each other through the bumps 5, and thereby the sensor chip 3 is fixed to the lower side of the flying leads 27 of which bending and rising are omitted so as to be lifted in a state where the diaphragm groove 31 faces downward.

As described above, the sensor chip 3 is fixed to the leading end portions of the flying leads 27 in a state where the diaphragm groove 31 faces downward.

The same effects as those of the first embodiment are also obtained by the pressure sensor 1 of the fourth embodiment described above.

Fifth Embodiment

Next, a fifth embodiment of a pressure sensor according to the invention will be described.

Figure 6:
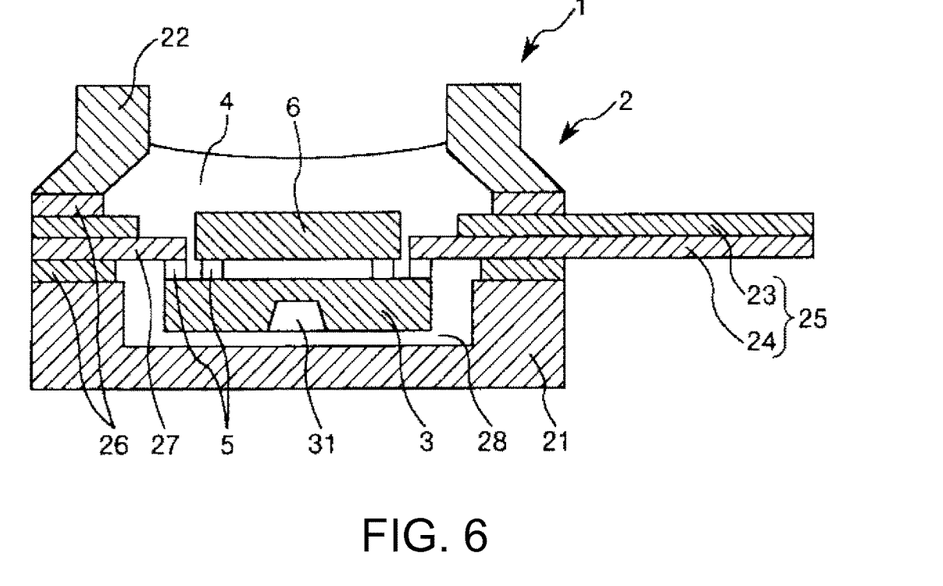
FIG. 6 is a vertical cross-sectional view illustrating a fifth embodiment of a pressure sensor according to the invention.

FIG. 6 is a vertical cross-sectional view illustrating the fifth embodiment of the pressure sensor according to the invention.

Hereinafter, the pressure sensor 1 of the fifth embodiment will be described focusing on differences from the pressure sensor 1 of the fourth embodiment described above and the description of the same matters will be omitted.

The pressure sensor 1 illustrated in FIG. 6 is different from the configuration of the sensor chip 3, and is similar to the pressure sensor 1 illustrated in FIG. 5 other than that the pressure sensor 1 includes the IC chip 6.

That is, in the pressure sensor 1 of the fifth embodiment, the formation of the IC circuit is omitted on the inside of the sensor chip 3 and the pressure sensor 1 includes the IC chip 6. Then, the terminal included in the IC chip 6 and the terminal included in the chip wiring section of the sensor chip 3 are electrically connected to each other through the bumps 5, and thereby the IC chip 6 is fixed to the upper side of the sensor chip 3 so as to be lifted to the sensor chip 3. According to such a configuration, since the IC chip 6 is interposed between the opening of the package 2 and the sensor chip 3, a surface opposite to the surface on which the diaphragm groove 31 is formed is covered (shielded from light) from the opening side of the package 2 by the IC chip 6. Thus, it is possible to suppress or prevent the chip wiring section, the IC circuit, and the like from deteriorating and degrading due to the light passing through the opening of the package 2.

As described above, the IC chip 6 is fixed to the leading end portions of the flying leads 27 through the sensor chip 3.

The same effects as those of the first embodiment are also obtained by the pressure sensor 1 of the fifth embodiment described above.

Sixth Embodiment

Next, a sixth embodiment of a pressure sensor according to the invention will be described.

Figure 7:
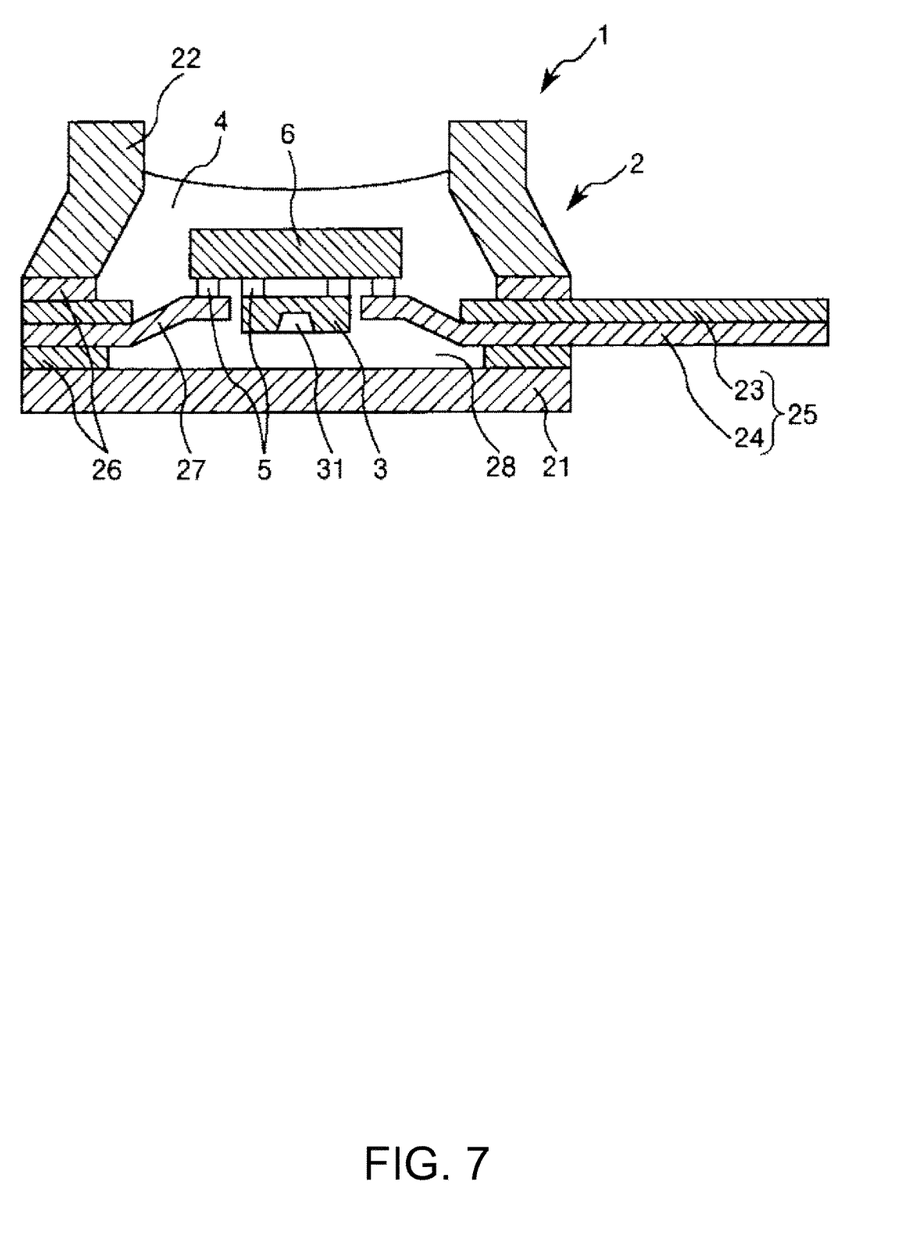
FIG. 7 is a vertical cross-sectional view illustrating a sixth embodiment of a pressure sensor according to the invention.

FIG. 7 is a vertical cross-sectional view illustrating the sixth embodiment of the pressure sensor according to the invention.

Hereinafter, the pressure sensor 1 of the sixth embodiment will be described focusing on differences from the pressure sensor 1 of the fifth embodiment described above and the description of the same matters will be omitted.

The pressure sensor 1 illustrated in FIG. 7 is similar to the pressure sensor 1 illustrated in FIG. 6 other than that the shape of the flying leads 27 is different and the arrangement positions of the sensor chip 3 and the IC chip 6 are different.

That is, in the pressure sensor 1 of the sixth embodiment, the flying leads 27 are bent upward and rise inside the internal space 28, and connection order of the sensor chip 3 and the IC chip 6 to the flying leads 27 is reversed.

More specifically, in the embodiment, first, the terminal included in the IC chip 6 and the leading end portions of the flying leads 27 are electrically connected to each other through the bumps 5, and thereby the IC chip 6 is fixed to the upper side of the flying leads 27 that are bent and rise so as to be lifted to the flying leads 27. Then, the terminal included in the chip wiring section of the sensor chip 3 and the terminal included in the IC chip 6 are electrically connected to each other through the bumps 5, and thereby the sensor chip 3 is fixed to the lower side of the IC chip 6 so as to be lifted to the IC chip 6 in a state where the diaphragm groove 31 faces downward. According to such a configuration, since the IC chip 6 is interposed between the opening of the package 2 and the sensor chip 3, a surface opposite to the surface on which the diaphragm groove 31 is formed is covered (light shielded) from the opening side of the package 2 by the IC chip 6. Thus, it is possible to suppress or prevent the chip wiring section, the IC circuit, and the like from deteriorating and degrading due to the light passing through the opening of the package 2.

As described above, the sensor chip 3 is fixed to the leading end portions of the flying leads 27 through the IC chip 6 in a state where the diaphragm groove 31 faces downward. As described above, it is possible to further surely reduce the stress from the outside transmitted from the flying leads 27 by interposing the IC chip 6.

The same effects as those of the first embodiment are also obtained by the pressure sensor 1 of the sixth embodiment described above.

Seventh Embodiment

Next, a seventh embodiment of a pressure sensor according to the invention will be described.

Figure 8:
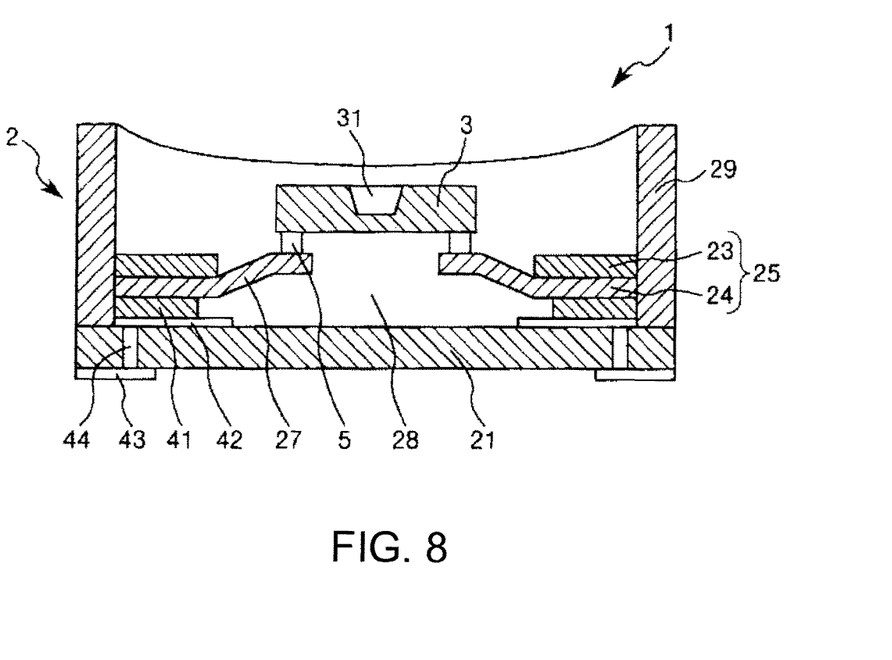
FIG. 8 is a vertical cross-sectional view illustrating a seventh embodiment of a pressure sensor according to the invention.

FIG. 8 is a vertical cross-sectional view illustrating the seventh embodiment of the pressure sensor according to the invention.

Hereinafter, the pressure sensor 1 of the seventh embodiment will be described focusing on differences from the pressure sensor 1 of the first embodiment described above and the description of the same matters will be omitted.

The pressure sensor 1 illustrated in FIG. 8 is similar to the pressure sensor 1 illustrated in FIGS. 1A and 1B other than that the configurations of the package 2 and the flexible wiring substrate 25 are different.

That is, in the pressure sensor 1 of the seventh embodiment, the package 2 has the base 21 having a configuration similar to that of the first embodiment and an upright section 29, and the upright section 29 is provided in a frame shape by standing from an edge portion of the base 21 so as to surround the edge portion. Therefore, an entire shape of the package 2 is a box shape (square container shape) and the internal space 28 that is open to the upper side thereof is formed.

Furthermore, vias 44 provided by passing through the thickness direction are provided in the bottom surface of the package 2, that is, in the base 21 and internal electrodes 42 are provided on the upper surface of the base 21 so as to correspond to the vias 44, and external electrodes 43 are provided on the lower surface of the base 21. According to such a configuration, it is possible to electrically connect the inside (internal space 28) of the package 2 to the outside of the package 2.

Furthermore, in the pressure sensor 1 of the seventh embodiment, the flexible wiring substrate 25 is configured of only the frame body 231 without including the band body 232, compared to the flexible wiring substrate 25 described in the first embodiment.

The flexible wiring substrate 25 having such a configuration is disposed on the bottom surface (base 21) of the package 2 and, at this time, the wiring 24 included in the flexible wiring substrate 25 is electrically connected to the internal electrode 42 through a conductive adhesive layer 41 configured of conductive adhesive.

Therefore, since the wiring 24, the conductive adhesive layer 41, the internal electrodes 42, the vias 44, and the external electrodes 43 are electrically connected to each other, it is possible to take out the electric signal generated in the sensor chip 3 accommodated in the internal space 28 of the package 2 from the package 2, that is, into the electronic apparatus or the moving object by electrically connecting, for example, a motherboard of an electronic apparatus or a moving object described below to the external electrodes 43.

According to the pressure sensor 1 having such a configuration, the band body 232 can be omitted and an entire length of the wiring 24 can be shortened, and, as a result, it is possible to realize high sensitivity of the pressure sensor 1.

The same effects as those of the first embodiment are also obtained by the pressure sensor 1 of the seventh embodiment described above.

Eighth Embodiment

Next, an eighth embodiment of a pressure sensor according to the invention will be described.

Figure 9:
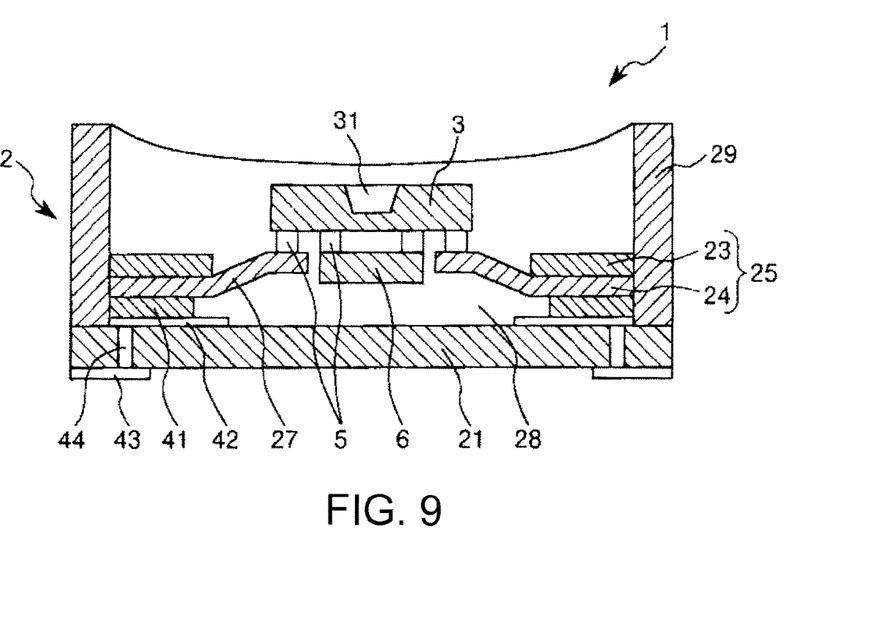
FIG. 9 is a vertical cross-sectional view illustrating an eighth embodiment of a pressure sensor according to the invention.

FIG. 9 is a vertical cross-sectional view illustrating the eighth embodiment of the pressure sensor according to the invention.

Hereinafter, the pressure sensor 1 of the eighth embodiment will be described focusing on differences from the pressure sensor 1 of the seventh embodiment described above and the description of the same matters will be omitted.

The pressure sensor 1 illustrated in FIG. 9 is similar to the pressure sensor 1 illustrated in FIG. 8 other than that the configuration of the sensor chip 3 is different and the pressure sensor 1 includes the IC chip 6.

That is, in the pressure sensor 1 of the eighth embodiment, the formation of the IC circuit is omitted on the inside of the sensor chip 3 and the pressure sensor 1 includes the IC chip 6. Then, the terminal included in the IC chip 6 and the terminal included in the chip wiring section of the sensor chip 3 are electrically connected to each other through the bumps 5, and thereby the IC chip 6 is fixed to the lower side of the sensor chip 3 so as to be lifted to the sensor chip 3.

As described above, the IC chip 6 is fixed to the leading end portions of the flying leads 27 through the sensor chip 3.

The same effects as those of the first embodiment are also obtained by the pressure sensor 1 of the eighth embodiment described above.

Ninth Embodiment

Next, a ninth embodiment of a pressure sensor according to the invention will be described.

Figure 10:
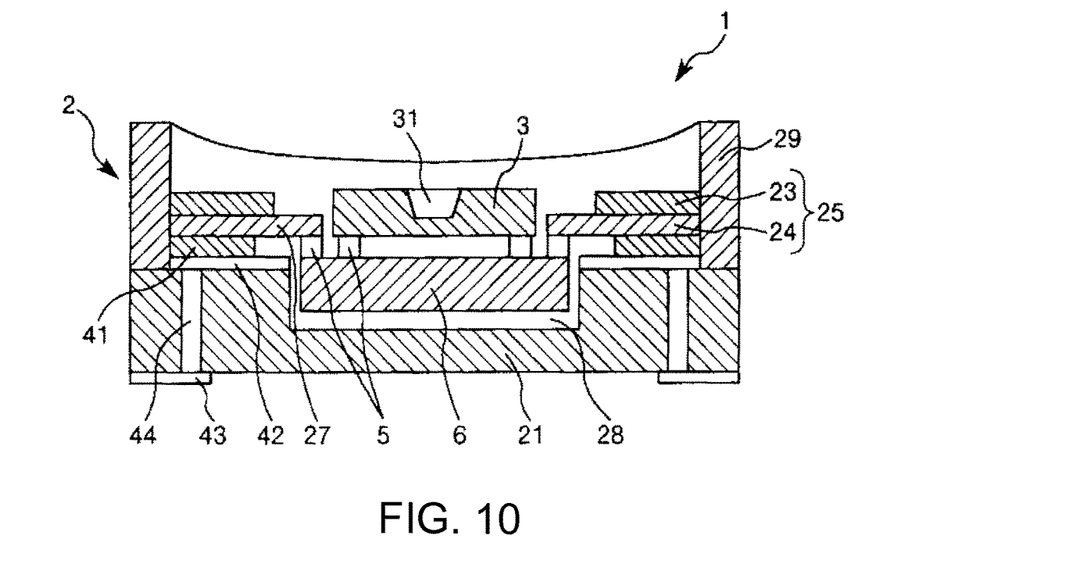
FIG. 10 is a vertical cross-sectional view illustrating a ninth embodiment of a pressure sensor according to the invention.

FIG. 10 is a vertical cross-sectional view illustrating the ninth embodiment of the pressure sensor according to the invention.

Hereinafter, the pressure sensor 1 of the ninth embodiment will be described focusing on differences from the pressure sensor 1 of the eighth embodiment described above and the description of the same matters will be omitted.

The pressure sensor 1 illustrated in FIG. 10 is similar to the pressure sensor 1 illustrated in FIG. 9 other than that the shape of the flying leads 27 is different and the arrangement positions of the sensor chip 3 and the IC chip 6 are different.

That is, in the pressure sensor 1 of the ninth embodiment, bending upward and rising of the flying leads 27 are omitted inside the internal space 28, and connection order of the sensor chip 3 and the IC chip 6 to the flying leads 27 is reversed.

More specifically, in the embodiment, first, the terminal included in the IC chip 6 and the leading end portions of the flying leads 27 are electrically connected to each other through the bumps 5, and thereby the IC chip 6 is fixed to the lower side of the flying leads 27 of which bending and rising are omitted so as to be lifted to the flying leads 27. Then, the terminal included in the chip wiring section of the sensor chip 3 and the terminal included in the IC chip 6 are electrically connected to each other through the bumps 5, and thereby the sensor chip 3 is fixed to the upper side of the IC chip 6 so as to be lifted to the IC chip 6 in a state where the diaphragm groove 31 faces upward.

As described above, the sensor chip 3 is fixed to the leading end portions of the flying leads 27 through the IC chip 6 in a state where the diaphragm groove 31 faces upward. As described above, it is possible to further surely reduce the stress from the outside transmitted from the flying leads 27 by interposing the IC chip 6 therebetween.

The same effects as those of the first embodiment are also obtained by the pressure sensor 1 of the ninth embodiment described above.

Tenth Embodiment

Next, a tenth embodiment of a pressure sensor according to the invention will be described.

Figure 11:
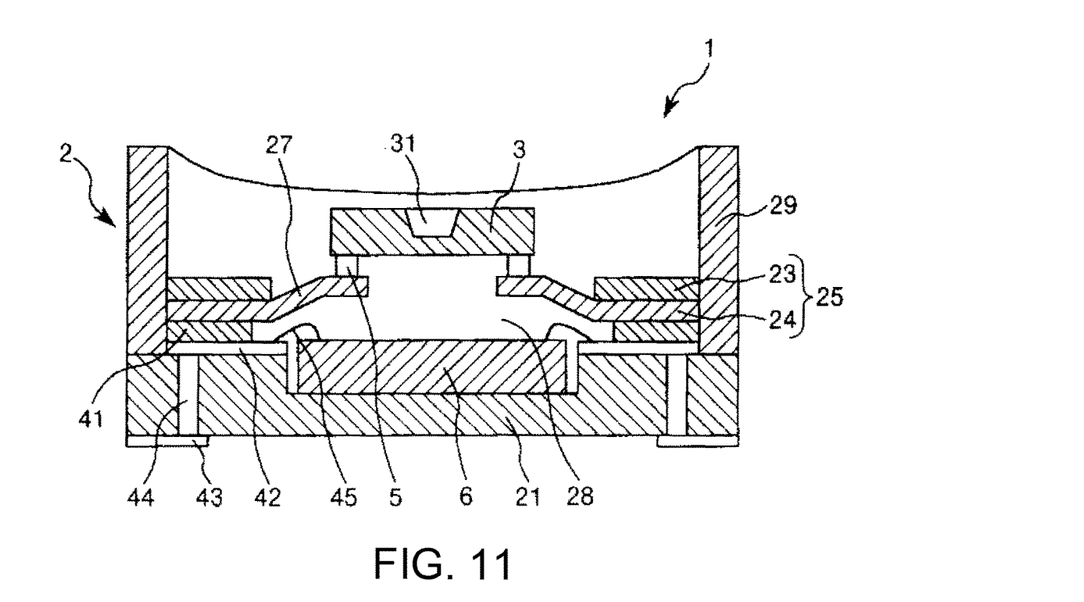
FIG. 11 is a vertical cross-sectional view illustrating a tenth embodiment of a pressure sensor according to the invention.

FIG. 11 is a vertical cross-sectional view illustrating the tenth embodiment of the pressure sensor according to the invention.

Hereinafter, the pressure sensor 1 of the tenth embodiment will be described focusing on differences from the pressure sensor 1 of the eighth embodiment described above and the description of the same matters will be omitted.

The pressure sensor 1 illustrated in FIG. 11 is similar to the pressure sensor 1 illustrated in FIG. 9 other than that the shape of the base 21 is different and the arrangement position of the IC chip 6 is different.

That is, in the pressure sensor 1 of the tenth embodiment, a concave section is formed on the upper surface side of the base 21, that is, on the bottom surface of the package 2 and the IC chip 6 is accommodated inside the concave section.

More specifically, in the embodiment, the IC chip 6 is accommodated inside the concave section provided in the base 21 and the terminal included in the IC chip 6 and the internal electrodes 42 are electrically connected to each other through a bonding wire 45.

As described above, the IC chip 6 is electrically connected to the sensor chip 3.

The same effects as those of the first embodiment are also obtained by the pressure sensor 1 of the tenth embodiment described above.

Moreover, in each embodiment described above, a case where the electrical connection between the flying leads 27 and the terminal included in the sensor chip 3 and/or the IC chip 6 is performed through the bump 5 is described, but the invention is not limited to the case, and the electrical connection may be directly performed by omitting the bump 5 by applying various bonding methods such as direct bonding.

2. Electronic Apparatus

Figure 12:
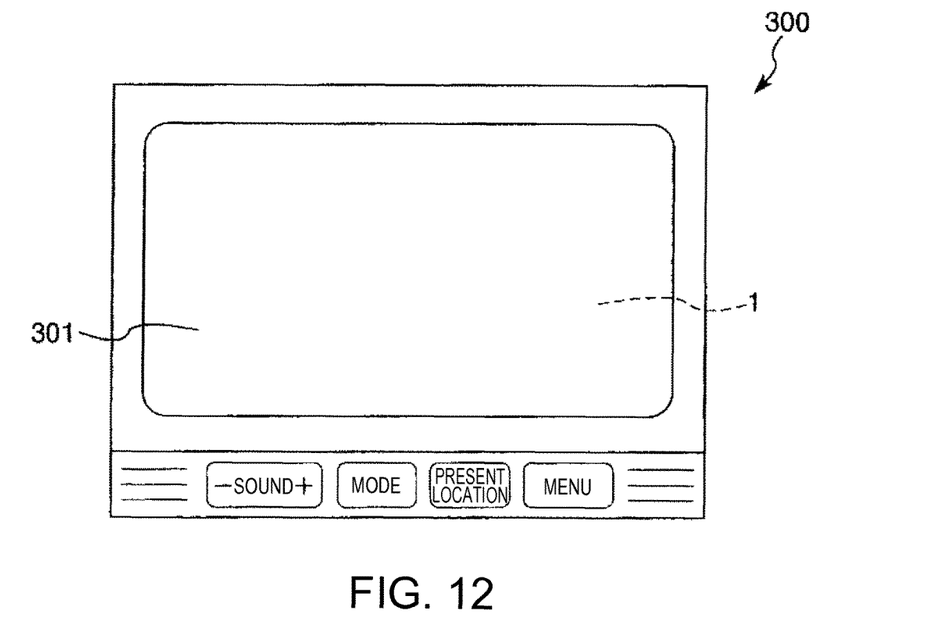
FIG. 12 is a front view illustrating an example of an electronic apparatus according to the invention.

Next, a navigation system to which an electronic apparatus including the pressure sensor according to the invention is applied will be described. FIG. 12 is a front view illustrated an example of the electronic apparatus according to the invention.

A navigation system 300 includes a position information obtaining unit that obtains information from map information (not illustrated) and a Global Positioning System (GPS), an autonomous navigation unit composed of a gyro sensor, an acceleration sensor, and vehicle speed data, the pressure sensor 1, and a display section 301 that displays predetermined position information or route information.

In the navigation system 300, the wiring 24 or the external electrodes 43 that are provided corresponding to the band body 232 are electrically connected to a motherboard included in the navigation system 300. The navigation system 300 has excellent reliability.

According to the navigation system 300, it is possible to obtain height information in addition to the obtained position information. When traveling on an elevated road which is indicated in substantially the same position as a general road in the position information, the navigation system cannot determine whether a vehicle travels on the general road or on the elevated road if the height information is not included so that the information of the general road is provided to a user as preferred information. Thus, in the navigation system 300 according to the embodiment, it is possible to obtain the height information by the pressure sensor 1 and a height change is detected due to entering the elevated road from the general road, and it is possible to provide the navigation information in the traveling state of the elevated road to the user.

Moreover, the display section 301 is configured to be compact and slim such as a liquid crystal panel display, or an Organic Electro-Luminescence (Organic EL) display.

3. Moving Object

Figure 13:
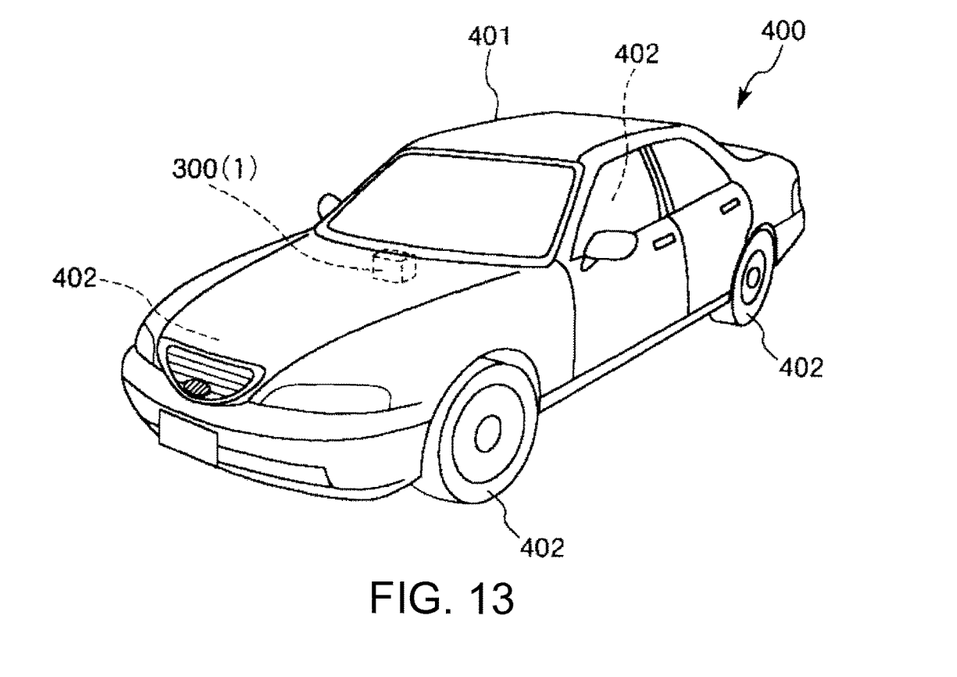
FIG. 13 is a perspective view illustrating an example of a moving object according to the invention.

Next, the moving object (moving object according to the invention) to which the pressure sensor according to the invention is applied will be described. FIG. 13 is a perspective view illustrating an example of the moving object according to the invention.

As illustrated in FIG. 13, a moving object 400 has a vehicle body 401 and four wheels 402, and is configured to rotate the wheels 402 by a power source (engine) (not illustrated) provided in the vehicle body 401. The navigation system 300 (pressure sensor 1) is built into such a moving object 400.

Moreover, the electronic apparatus or the moving object in which the pressure sensor according to the invention is incorporated is not limited to embodiments described above, and, for example, can be applied to an altimeter, a mobile phone, a digital still camera, an ink-jet ejection apparatus (for example, an ink jet printer), a personal computer (mobile personal computer, a laptop personal computer), a television, a video camera, a video tape recorder, a car navigation device, a pager, an electronic organizer (including communication function), an electronic dictionary, a calculator, an electronic game machine, a word processor, a workstation, a videophone, a security television monitor, electronic binoculars, a POS terminal, medical equipment (for example, an electronic thermometer, a blood pressure meter, a blood glucose meter, an electrocardiogram measuring device, an ultrasonic diagnostic apparatus, an electronic endoscope), a fish finder, various measuring equipment, instruments (for example, gauges for a vehicle, an aircraft and a ship), a flight simulator, terrestrial digital broadcasting, a mobile phone base station, and the like.

As described above, the pressure sensor, the electronic apparatus, and the moving object according to the invention are described with reference to the illustrated embodiments, but the invention is not limited to the embodiments and the configuration of each part can be replaced by another arbitrary configuration matter having the same function. Furthermore, another arbitrary configuration matter or process may be added.

For example, in the invention, it is possible to combine an arbitrary two or more constitutions illustrated in the first to tenth embodiments.

The entire disclosure of Japanese Patent Application No. 2013-205754, filed Sep. 30, 2013 is expressly incorporated by reference herein.

What is claimed is:

1. A pressure sensor comprising:
   a sensor chip that detects pressure and has a plurality of terminals;
   a package that has an internal space in which the sensor chip is accommodated; and
   a plurality of flying leads that protrude from an inner wall of the package into the internal space, each of the plurality of flying leads being a single continuous member,
   wherein ends of the plurality of flying leads are located at a periphery of the sensor chip, the ends of the plurality of flying leads are directly connected to the plurality of terminals of the sensor chip, and the sensor chip is supported by the plurality of flying leads, and
   wherein the sensor chip is disposed away from the inner wall of the package.

2. The pressure sensor according to claim 1,
   wherein the internal space is filled with a resin having flexibility.

3. The pressure sensor according to claim 1,
   wherein the sensor chip has a diaphragm groove,
   wherein the package has an opening, and
   wherein the diaphragm groove faces the opening.

4. The pressure sensor according to claim 1,
   wherein the flying leads are conductive.

5. The pressure sensor according to claim 1,
   wherein the sensor chip is connected to a surface, which faces an opening of the package, of each of the ends of the plurality of flying leads.

6. The pressure sensor according to claim 1, further comprising:
   an IC chip in the internal space.

7. An electronic apparatus comprising:
the pressure sensor according to claim 1.

8. A moving object comprising:
the pressure sensor according to claim 1.

9. A pressure sensor comprising:
a sensor chip that detects pressure,
an IC chip that is connected to the sensor chip, the IC chip being arranged to face the sensor chip, the IC chip having a plurality of terminals;
a package that has an internal space in which the sensor chip and the IC chip are accommodated; and
a plurality of flying leads that protrude from an inner wall of the package into the internal space, each of the plurality of flying leads being a single continuous member,
wherein ends of the plurality of flying leads are located at a periphery of the IC chip, the ends of the plurality of flying leads are directly connected to the plurality of terminals of the IC chip, and the IC chip is supported by the plurality of flying leads, and
wherein the sensor chip and the IC chip are disposed away from the inner wall of the package.

10. The pressure sensor according to claim 9,
wherein the internal space is filled with a resin having flexibility.

11. The pressure sensor according to claim 9,
wherein the sensor chip has a diaphragm groove,
wherein the package has an opening, and
wherein the diaphragm groove faces the opening.

12. The pressure sensor according to claim 9,
wherein the flying leads are conductive.

13. An electronic apparatus comprising:
the pressure sensor according to claim 9.

14. A moving object comprising:
the pressure sensor according to claim 9.

\* \* \* \* \*